United States Patent
Seki et al.

(10) Patent No.: US 6,659,256 B2
(45) Date of Patent: Dec. 9, 2003

(54) TWO-WHEEL AND FOUR-WHEEL DRIVING CHANGE-OVER DEVICE FOR VEHICLE

(75) Inventors: Bunzo Seki, Saitama (JP); Akio Handa, Saitama (JP); Hiroaki Tomita, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/808,361

(22) Filed: Mar. 15, 2001

(65) Prior Publication Data

US 2001/0030073 A1 Oct. 18, 2001

(30) Foreign Application Priority Data

Mar. 15, 2000 (JP) ........................................ 2000-072362

(51) Int. Cl.[7] ............................................... B60K 41/26
(52) U.S. Cl. ..................... 192/222; 192/48.92; 180/233
(58) Field of Search ........................... 192/222, 36, 38, 192/44, 35, 48.92, 85 AA; 180/247, 233, 234, 244

(56) References Cited

U.S. PATENT DOCUMENTS

| 4,559,846 A | * | 12/1985 | Cochran et al. ............ 180/247 |
| 4,715,467 A | * | 12/1987 | Sakai ......................... 180/233 |
| 5,195,604 A | * | 3/1993 | Brockett et al. ............ 180/244 |
| 6,386,348 B1 | * | 5/2002 | Kunii ...................... 192/103 F |

* cited by examiner

Primary Examiner—Pam Rodriguez
(74) Attorney, Agent, or Firm—Birch, Stewart, Kolasch & Birch, LLP

(57) ABSTRACT

A two-wheel and four-wheel driving change-over device for a vehicle is provided. A change-over unit intermittently performs power transmission for the power transmission mechanism. The change-over unit includes a driving shaft connected to a driving side, a driven shaft fitted to the driving shaft with an annular clearance therebetween. A plurality of engaging or disengaging members installed in a clearance between the driving shaft and driven shaft are engaged with or disengaged from the opposing surfaces for performing a connecting operation and a disconnecting operation between the driving shaft and driven shaft. A change-over mechanism is provided for selectively positioning the engaging or disengaging members between a position where the driving shaft and driven shaft are connected and a position where the driving shaft and driven shaft are disconnected.

16 Claims, 6 Drawing Sheets

Electromagnetic clutch OFF (b)

Electromagnetic clutch ON

TWO-WHEEL AND FOUR-WHEEL DRIVING CHANGE-OVER DEVICE FOR VEHICLE

BACKGROUND OF THE INVENTION

1. Field of the Invention

This invention relates to a two-wheel and four-wheel driving change-over device for a vehicle.

2. Description of Background Art

A vehicle is known in the prior art wherein the operating condition can be changed over between two-wheel drive and four-wheel drive.

FIGS. 4 and 5 illustrate one example of the aforesaid vehicle. In FIGS. 4 and 5, the vehicle 1 includes a vehicle body frame 3 having an engine 2 mounted at a central part thereof. Front wheels 4 and rear wheels 5 are mounted at both the front and rear sides of the vehicle body frame 3. A steering handlebar 6 is positioned at the forward upper part of the vehicle body frame 3 for steering the front wheels 4. A fuel tank 7 is fixed above the engine 2 and is mounted on the vehicle body frame 3. A seat 8 is fixed to the rear part of the fuel tank 7.

As shown in FIG. 5, each of the front wheels 4 is supported by suspension devices 9 installed at both of the front sides of the vehicle body frame 3 in such a way that the front wheels may be moved up and down. Each of the rear wheels 5 is supported by suspension devices 10 installed at both of the rear sides of the vehicle body frame 3 in such a way that the rear wheels may be moved up and down.

In addition, a forward central part and a rearward central part of the vehicle body frame 3 are provided with a final gear reducer 13 for front wheels and a final gear reducer 14 for rear wheels connected to the engine 2 by propeller shafts 11, 12, and the right and left front wheels 4 and the right and left rear wheels 5 are connected to each of these final gear reducer 13 for the front wheels and final gear reducer 14 for the rear wheels.

Then, for example, between the final gear reducer 13 for the front wheels and the propeller shaft 11 is arranged a two-wheel and four-wheel driving change-over device for connecting or disconnecting power transmitted to the front wheels 4 and changing over between the rear wheel drive and the four wheel drive.

In some cases, the two-wheel and four-wheel drive change-over device is arranged between the rear propeller shaft 12 and the final gear reducer 14 for the rear wheels for changing over between the front wheel drive and the four-wheel drive.

This change-over of the driving states is dependent on a road surface state and a running form and this is changed over by a driver when required.

For the two-wheel and the four-wheel change-over device, the structure shown in FIG. 6, for example, has been proposed.

In FIG. 6, the two-wheel and four-wheel driving change-over device denoted by reference numeral 15 is constituted of two input shaft composing units 16a and 16b in which an input shaft 16 for the final gear reducer 13 for the front wheels is formed to be axially divided into two segments and abutted to each other on the same axis, and a change-over unit 17 is provided for performing connecting and disconnecting operations of these units.

Describing it in detail, a column-like position setting protrusion 18 protrudes at a central part of the end surface of the input shaft composing unit 16a positioned at the final gear reducer 13 for the front wheels. In addition, the central part of the end surface of the input shaft composing unit 16b positioned outside is formed with a position setting recess 19 to which the position setting protrusion 18 is rotatably fitted. Both input shaft composing units 16a and 16b are abutted to each other in such a way that the position setting protrusion 18 and the position setting recess 19 are fitted to each other, thereby both input shaft composing units 16a, 16b are positioned on the same axis and they are connected in a relative rotatable manner.

In addition, an outer circumferential surface of the abutting part of each of both input shaft composing units 16a and 16b is formed with a spline (not shown) and a change-over unit 17 so as to enclose the abutted part.

The change-over unit 17 is constituted of a change-over ring 20 formed with a spline at its inner surface, slidably fitted to the abutting part of both input shaft composing units 16a, 16b and engaged with or disengaged from each of the splines. A driving mechanism 21 is composed of a solenoid for selectively moving the change-over ring 20 to a position where the change-over ring is slid in an axial direction of both input shaft composing units 16a, 16b and engaged only with one input shaft composing unit 16a and a position where the change-over ring is concurrently engaged with the splines of both input shaft composing units 16a, 16b.

The two-wheel and four-wheel driving change-over device 15 provides a two-wheel driving state in which the change-over ring 20 is moved in one direction by the driving mechanism 21, engaged only with the input shaft composing unit 16a to shut off transmission of the driving force toward the front wheels 4 and only the rear wheels are driven, and a four-wheel driving state in which the change-over ring 20 is slid, the change-over ring 20 is engaged with the input shaft composing unit 16b under a state in which the change-over ring 20 is engaged with the input shaft composing unit 16a, thereby both input shaft composing units 16a and 16b are connected to each other, the driving force is transmitted to the front wheels 4 and then both front wheels 4 and rear wheels 5 are concurrently driven.

However, such a two-wheel and four-wheel driving change-over device 15 of the prior art leaves some problems to be improved as follows.

When the driving form is changed over, if there is a slight difference in peripheral speed between the front wheels 4 and the rear wheels 5, a problem results in that an engagement between the change-over ring 20 and the input shaft composing unit 16b is not performed well and the change-over cannot be carried out.

Further, even in the case where the change-over is performed, there is also a problem that the splines abut to each other when the change-over is performed and an unusual noise is produced.

Then, in order to solve such problems as above, it becomes necessary to provide a mechanism in which the spline in the change-over ring 20 and the spline in the input shaft composing unit 16b are synchronized to each other (their positions are aligned to each other), so that the structure becomes complex, and when the two-wheel and four-wheel driving change-over device 15 is assembled, it is necessary to substantially change the members at the assembled positions from the existing structure.

SUMMARY AND OBJECTS OF THE INVENTION

The present invention provides a two-wheel and four-wheel driving change-over device for a vehicle in which its constitution is simple, assembling can be carried out with as few changes in the existing construction as possible and less frequent occurrences of unusual noise.

A two-wheel and four-wheel driving change-over device for a vehicle described in a first aspect of the present invention is made such that there is provided a change-over unit arranged either at a power transmission mechanism installed between an engine and the front wheels or at a power transmission mechanism installed between the engine and the rear wheels and for performing intermittently power transmission at this power transmission mechanism characterized in that this change-over unit is constituted of a driving shaft connected to a driving side. A driven shaft is fitted to the driving shaft with an annular clearance being provided. A plurality of engaging or disengaging members are installed at a clearance between the driving shaft and driven shaft. The plurality of engaging or disengaging members are engaged with or disengaged from these opposing surfaces to perform a connecting operation and a disconnecting operation between the driving shaft and driven shaft. A change-over mechanism is provided for selectively positioning the engaging or disengaging members between a position where the driving shaft and driven shaft are connected and a position where said driving shaft and driven shaft are disconnected. A casing encloses the above components.

A two-wheel and four-wheel driving change-over device for a vehicle according to a second aspect of the present invention includes a power transmission mechanism having the change-over unit according to the first aspect installed therein is provided with a final gear reducing unit, the driven shaft is inserted into this final gear reducing unit as an input shaft of the final gear reducing unit, a casing for the change-over unit is fixed to the final gear reducing unit and the casing is provided with bearings for supporting the driving shaft and driven shaft.

A two-wheel and four-wheel driving change-over device for a vehicle according to a third aspect of the present invention includes an outer ring to which either the driving shaft or driven shaft is connected through a spline that is rotatably installed in the casing according to the first or second aspect. An inner ring is provided to which either the driven shaft or the driving shaft is connected through a spline that is internally inserted in this outer ring in a coaxial manner, and the engaging or disengaging member is installed between the outer ring and inner ring.

A two-wheel and four-wheel driving change-over device for a vehicle according to a fourth aspect includes the change-over mechanism according to any one of the first to third aspect for disengaging the driven shaft from the driving shaft when the vehicle is braked.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
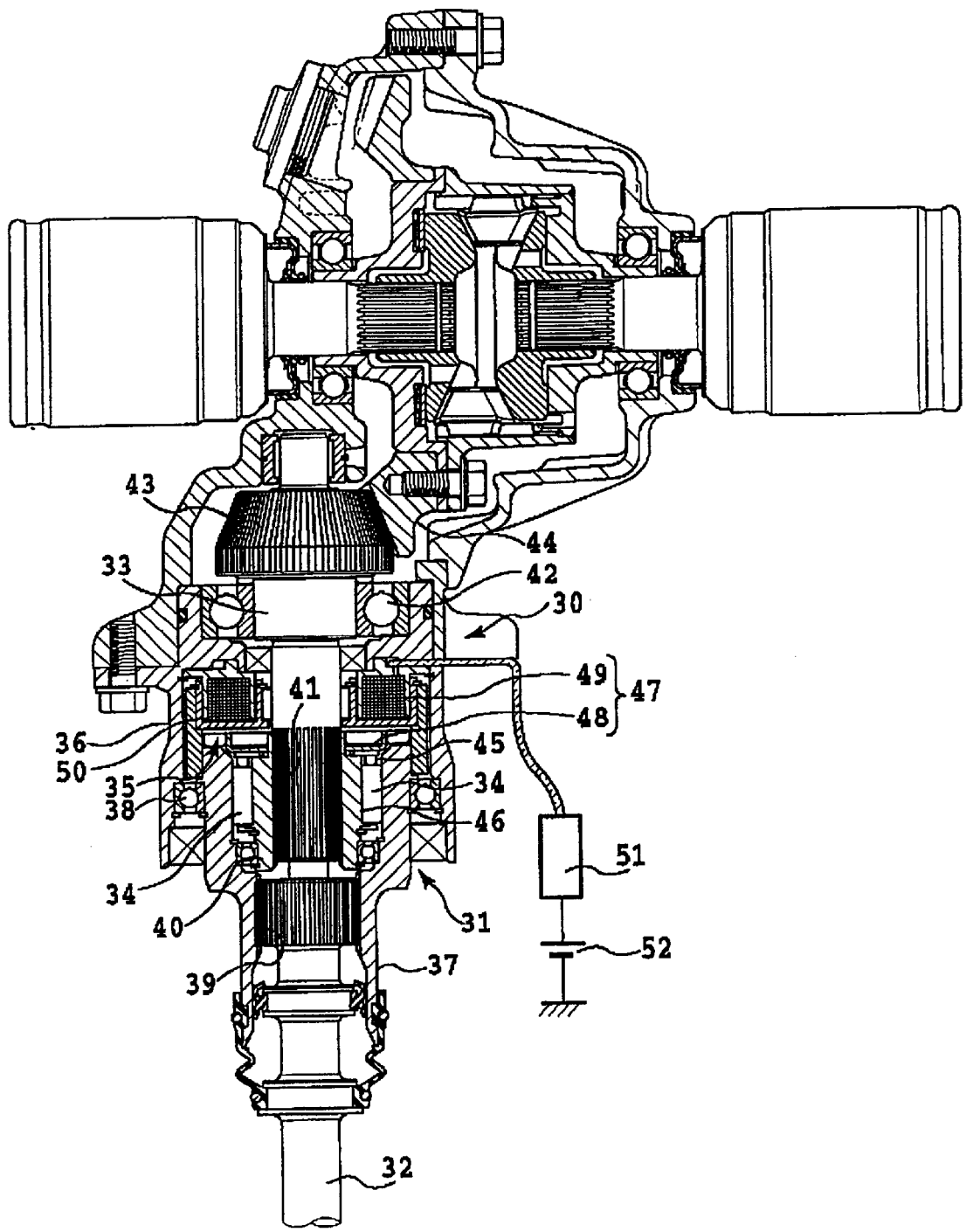
FIG. 1 is a sectional view for showing one preferred embodiment of the present invention.
Figure 2:
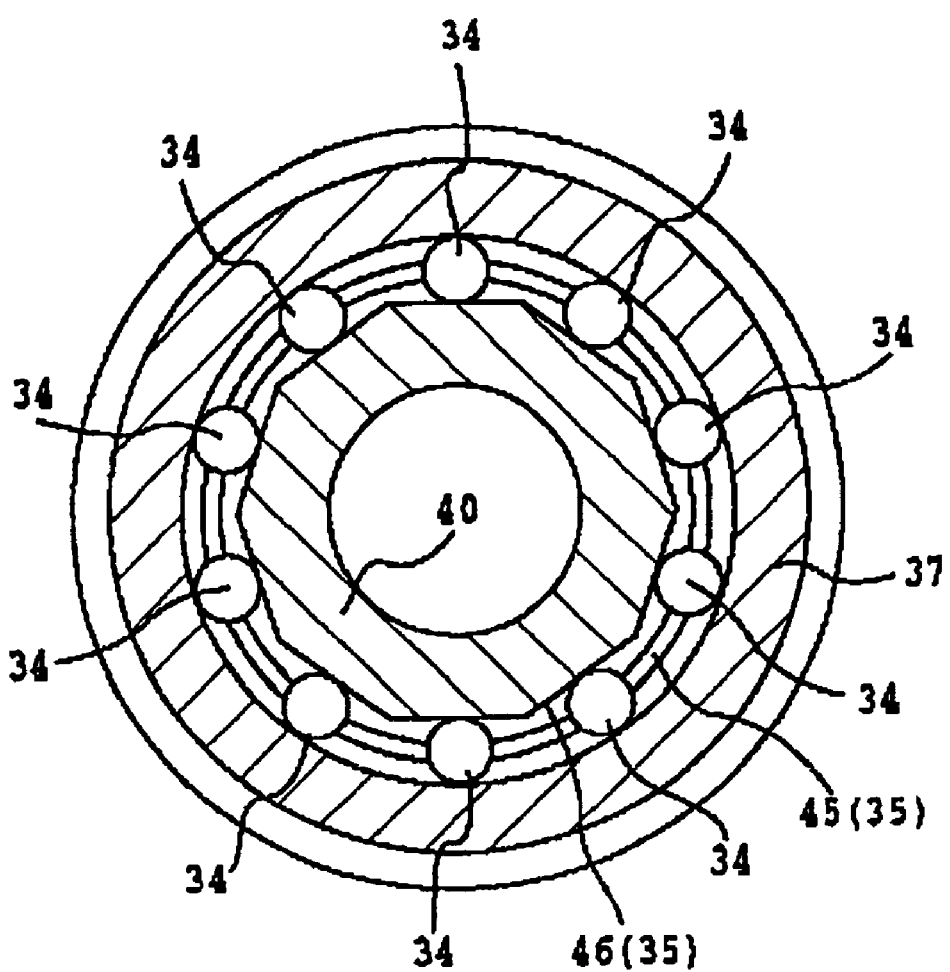
FIG. 2 illustrates one preferred embodiment of the present invention and is a longitudinal sectional view for showing its substantial part.
Figure 3A:
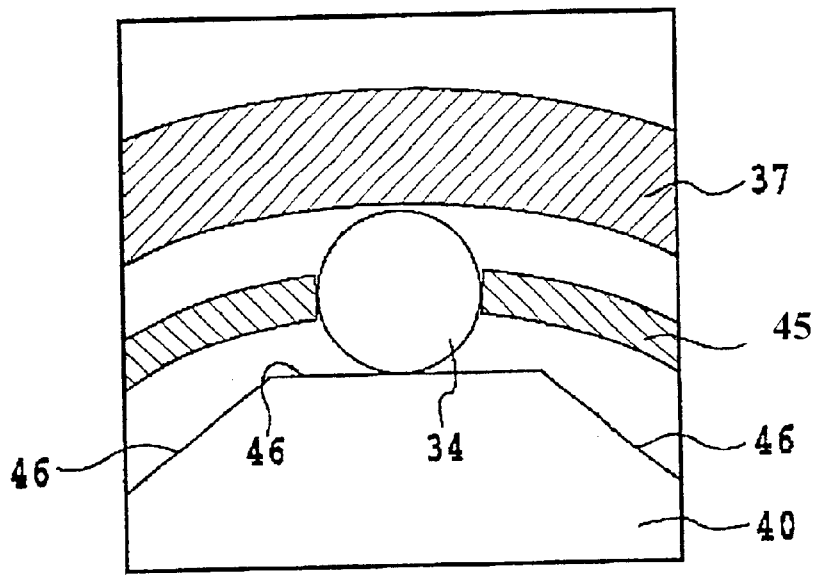
FIGS. 3(a) & 3(b) illustrate one preferred embodiment of the present invention and are enlarged sectional views for showing a substantial part to illustrate the operation of a driving change-over device.
Figure 3B:
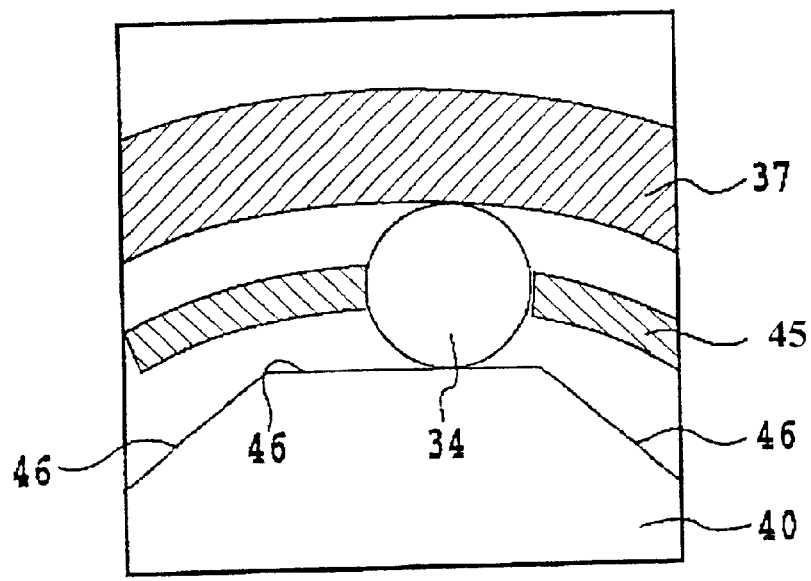

Referring to FIGS. 1 to 3, one preferred embodiment of the present invention will be described as follows.

Figure 4:
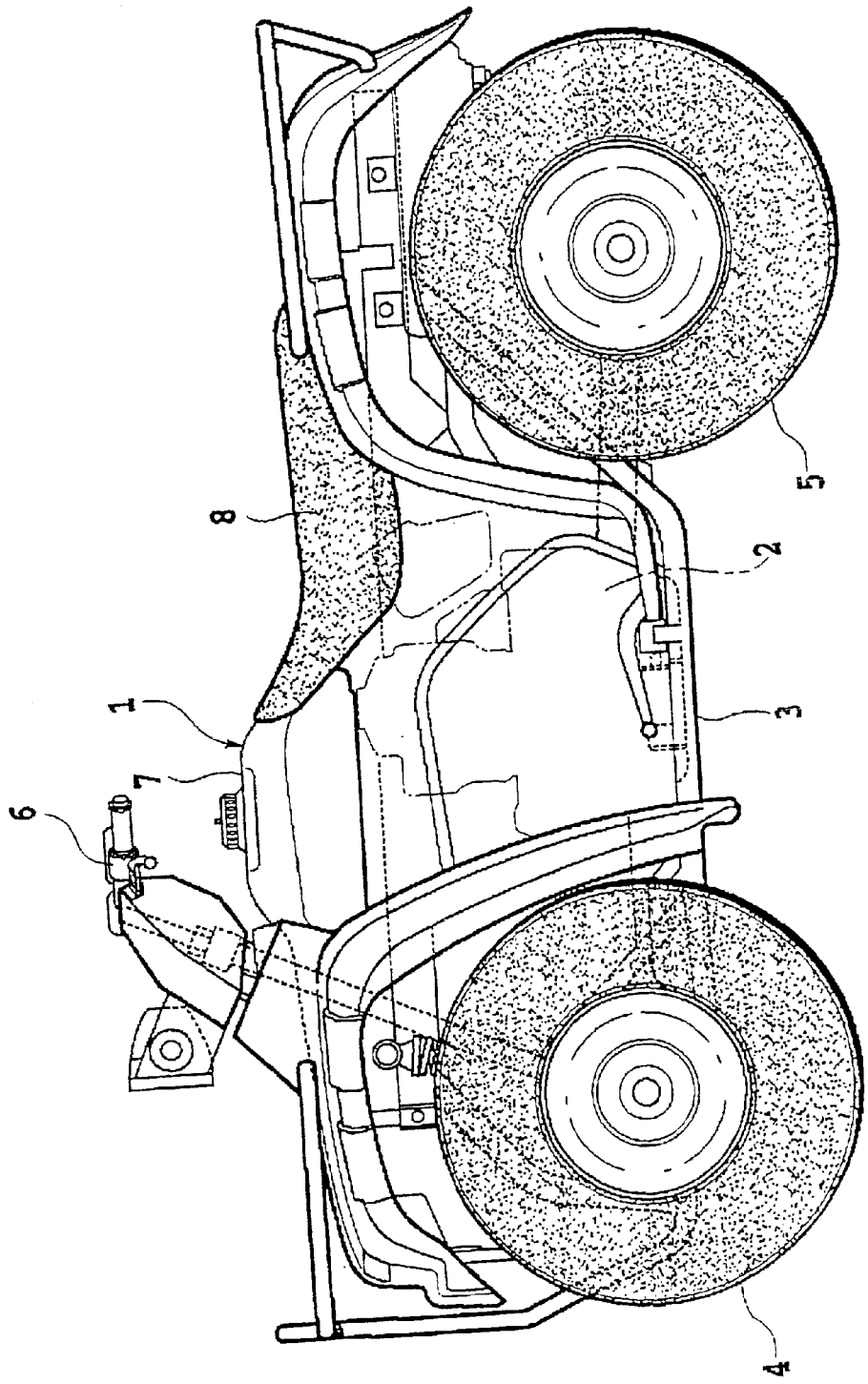
FIG. 4 is a side elevational view for showing one example of a vehicle equipped with a two-wheel and four-wheel driving change-over device.
Figure 5:
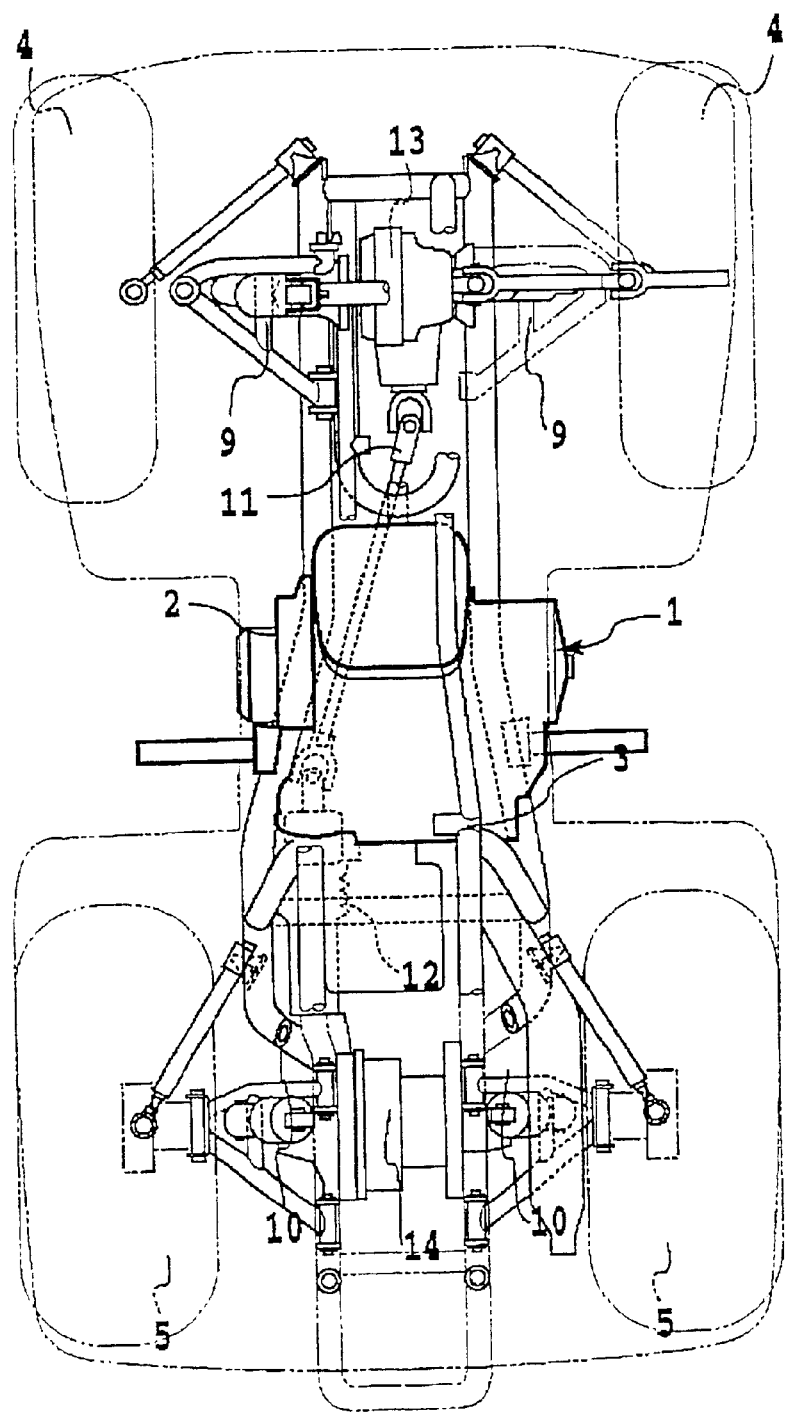
FIG. 5 is a top plan view for illustrating a chassis configuration of the vehicle shown in FIG. 5.
Figure 6:
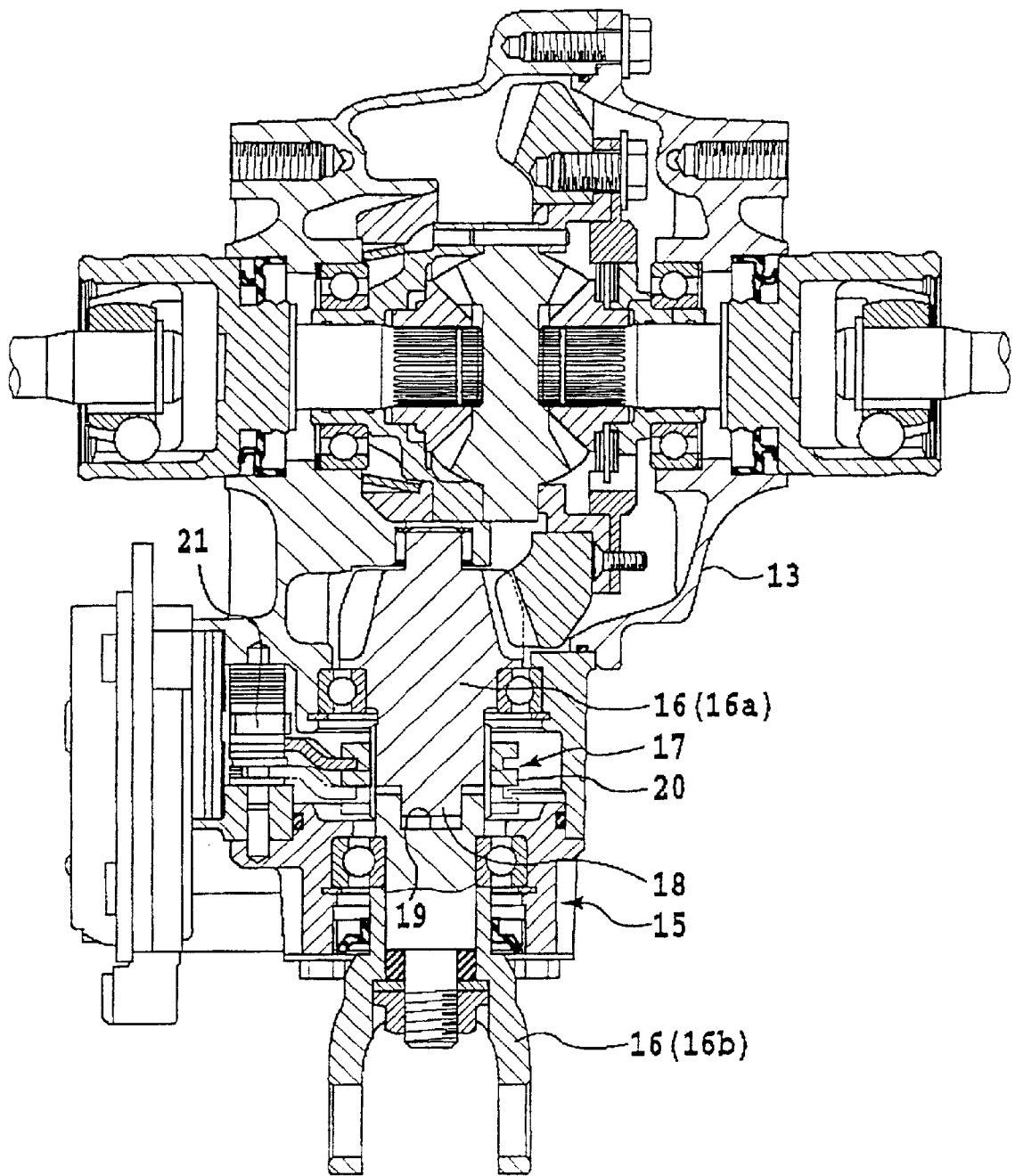
FIG. 6 is a sectional view for showing a substantial part to illustrate one example of structure of the prior art two-wheel and four-wheel driving change-over device.

In the following description, the major component parts of the vehicle are denoted by the same reference numerals that are common with the reference numbers shown in FIGS. 4 and 5, and their description is eliminated.

As illustrated in FIG. 1, the two-wheel and four-wheel driving change-over device 31 for a vehicle of the preferred embodiment of the present invention (hereinafter abbreviated as a driving change-over device) is installed at a power transmission mechanism arranged between the front wheels 4 and the engine 2, which includes a change-over unit 31 for connecting or disconnecting power transmission at the power transmission mechanism. This change-over unit 31 includes a driving shaft 32 connected to a driving side; a driven shaft 33 fitted to this driving shaft 32 with an annular clearance provided therebetween. A plurality of engaging or disengaging members 34 are installed at a clearance between the driving shaft 32 and driven shaft 33 and are engaged with or disengaged from the opposing surfaces to perform a connecting operation and a disconnecting operation between the driving shaft 32 and driven shaft 33. A change-over mechanism 35 is provided for selectively positioning the engaging or disengaging members 34 between a position where the driving shaft 32 and driven shaft 33 are connected and a position where the driving shaft 32 and driven shaft 34 are disconnected. A casing 36 is provided for enclosing these components.

In the preferred embodiment of the present invention, a cylindrical outer ring 37 that projects toward the engine 2 is rotatably arranged within the casing 36 through the bearing 38.

The inner circumferential surface at the end part of the engine 2 of the outer ring 37 is formed with a spline 39, the driving shaft 32 is inserted into the outer ring 37 while being engaged with the spline 39, thereby the driving shaft 32 and the outer ring 37 are connected to each other.

In addition, the cylindrical inner ring 40 is arranged within the outer ring 37 with an annular clearance of predetermined width between the cylindrical inner ring and the inner circumferential surface of the outer ring 37.

The inner surface of this inner ring 40 is formed with a spline 41, and the driven shaft 33 inserted into the casing 36 is connected to the inner ring 40 through the spline 41.

Then, an intermediate part of the driven shaft 33 in its longitudinal direction is rotatably supported by the bearing 42 fixed to the casing 36.

Additionally, a bevel gear 43 is integrally arranged with the extreme end of the driven shaft 33 and is engaged with a ring gear 44 of the final gear reducer 13 for the front wheels.

As shown in FIGS. 1 and 2, the engaging or disengaging member 34 forming the change-over unit 31 is constructed by a plurality of rollers arranged in parallel with the axis of the outer ring 37, wherein the change-over mechanism 35 includes a retainer 45 rotatably supporting the engaging or disengaging member 34 and installed at the outer ring 37 in such a way that it can be rotated in a relative manner and relatively movable around the axis. A cam 46 is formed at the surface of the inner ring 40 for moving the engaging or disengaging member 34 in a radial direction as relative motion with the retainer 45 is carried out.

Then, the end part positioned inside the casing 36 of the outer ring 37 is provided with an electromagnetic clutch 47 constituting the change-over mechanism 35 to perform both fixing and separating operations for the retainer 45 and the outer ring 37.

This electromagnetic clutch 47 includes a clutch plate 48 inserted between the retainer 45 and the outer ring 37, and an electromagnetic coil 49 for performing a press contacting operation and a separating operation of the clutch plate 48.

This electromagnetic coil 49 is set to a connected state by magnetically exciting the clutch plate 48, thereby the retainer 45 and the outer ring 37 are fixed in such a way that they may not be relatively rotated.

In addition, the electromagnetic coil 49 is formed in an annular shape, and stored in a housing 50 similarly formed into an annular shape and including an iron core therein. The housing 50 is installed in the casing 36 while enclosing the driven shaft 33, thereby it is fixed to the casing 36.

The outer ring 37, inner ring 40 and change-over mechanism 35 are assembled into the casing 36 to form a unit. As shown in FIG. 1, under a state in which the driven shaft 33 is installed, the casing 36 is fastened with bolts to the case of the final gear reducer 13 for the front wheels and fixed to the final gear reducer 13 for the front wheels.

In addition, a control unit 51 for controlling turning-ON or turning-OFF the coil, and a power supply 52 for supplying a driving electrical power are connected to the electromagnetic coil 49.

The driving change-over device 30 in accordance with the preferred embodiment as described above shuts off electrical energization for the electromagnetic coil 49 to release the transmittance of the driving force to the front wheels 4, and releases the fixed state between the retainer 45 and the outer ring 37 under the application of the electromagnetic clutch 47.

With such an arrangement as above, as shown in FIG. 3(*a*), the engaging or disengaging member 34 is positioned at the bottom part of the cam 46 and held at the position spaced apart from the outer ring 37.

As a result, the outer ring 37 and the inner ring 40 are separated from each other, the rotation of the driving shaft 32 is prevented from being transmitted to the driven shaft 33 and driving force supplied to the front wheels 4 is stopped.

In addition, in order to attain the four-wheel driving state, the electromagnetic coil 49 is electrically energized to cause the electromagnetic clutch 47 to be connected, thereby the retainer 45 is fixed to the outer ring 37.

With such an arrangement as above, the engaging or disengaging member 34 held at the retainer 45 is moved together with the outer ring 37, and as shown in FIG. 3(*b*), it is moved to the top part of the cam 46 formed at the inner ring 40 and at the same time it is abutted against the inner surface of the outer ring 37.

As a result, the outer ring 37 and the inner ring 40 are connected through the engaging or disengaging member 34 and along with this operation, the driving shaft 32 and the driven shaft 33 are connected to each other, rotation of the driving shaft 32 is transmitted to the driven shaft 33 and the driving of the front wheels 4 is started.

In the case of the driving change-over device 30 of the preferred embodiment of the present invention constituted in this way, the engaging or disengaging member 34 is held between the outer ring 37 and the inner ring 40, thereby it becomes a state in which the power can be transmitted, so that an engagement sound of the parts is quite low, and as a result, the occurrence of an unusual noise at the time of the change-over of the driving state can be restricted.

Further, it can be installed by making the change-over unit 31 into a unit-like device and by fixing the change-over unit 31 to the final gear reducer 13 for the front wheels, so that it can be assembled into a device without substantial changes of the existing structure.

In addition, even if there is a difference in the peripheral speed between the front wheels 4 and the rear wheels 5, both the connection and the separation between the driving shaft 32 and the driven shaft 33 can be carried out. It is therefore not necessary to arrange any complex auxiliary mechanism such as a synchronizing mechanism and also in view of this arrangement, the construction of the change-over device is simplified.

Further, various kinds of shapes or sizes in each of the composing members shown in the aforesaid preferred embodiment are merely examples and they can be changed in various manners in response to requirements in design.

As described above, since the present invention is operated such that both the connection and the separation between the driving shaft and driven shaft are carried out by the engaging or disengaging member installed at the fitted portion between the driving shaft and the driven shaft. Thus, a smooth connecting and separation can be carried out even in the case where there is a difference in rotating speed.

Accordingly, it is not necessary to arrange any complex auxiliary mechanism such as a synchronizing mechanism and a simple structure can be provided.

In addition, it is possible to reduce the engagement sound at the time of the connection and the separation, resulting in less frequent occurrences of an unusual noise at the time of the change-over of the driving state.

Further, since it is possible to make the change-over unit into a unit-like device that can be installed by fixing to an existing structure such as a final gear reducing unit, the assembling can be carried out without substantial changes of the existing structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-wheel and four-wheel driving change-over device for a vehicle having a change-over unit arranged either at a power transmission mechanism installed between an engine and front wheels or at a power transmission mechanism installed between the engine and rear wheels and for providing intermittent power transmission from the power transmission mechanism, comprising:

a driving shaft connected to a driving side;

a driven shaft fitted to the driving shaft with a clearance disposed therebetween;

a plurality of engaging or disengaging members, installed in the clearance between the driving shaft and driven shaft, engage with or disengage from opposing surfaces to perform a connecting operation and a disconnecting operation between the driving shaft and driven shaft;

a change-over mechanism for selectively positioning the engaging or disengaging members between a position where said driving shaft and driven shaft are connected and a position where said driving shaft and driven shaft are disconnected;

a casing enclosing the change-over mechanism, one end of the casing extending into a final gear reducing unit, wherein the one end of the casing extending into the final gear reducing unit includes a first bearing for rotatably supporting the driven gear, the first bearing being positioned adjacent to a bevel gear arranged at an extreme end of the driven gear.

2. The two-wheel and four-wheel driving change-over device for a vehicle according to claim 1, wherein said change-over unit is installed in said power transmission mechanism and includes the final gear reducing unit, said driven shaft is inserted into the final gear reducing unit as an input shaft of said final gear reducing unit, and said casing is fixed to said final gear reducing unit.

3. The two-wheel and four-wheel driving change-over device for a vehicle according to claim 2, wherein an outer ring is connected to either said driving shaft or driven shaft through a spline is rotatably installed in said casing, an inner ring is connected to either said driven shaft or driving shaft through a spline and is internally inserted in the outer ring in a coaxial manner, and said plurality of engaging or disengaging members is installed between the outer ring and inner ring.

4. The two-wheel and four-wheel driving change-over device for a vehicle according to claim 2, wherein said change-over mechanism disengages said driven shaft from said driving shaft when the vehicle is braked.

5. The two-wheel and four-wheel driving change-over device for a vehicle according to claim 1, wherein an outer ring is connected to either said driving shaft or driven shaft through a spline and is rotatably installed in said casing, an inner ring is connected to either said driven shaft or driving shaft through a spline and is internally inserted in the outer ring in a coaxial manner, and said plurality of engaging or disengaging members is installed between the outer ring and inner ring.

6. The two-wheel and four-wheel driving change-over device for a vehicle according to claim 5, wherein said change-over mechanism disengages said driven shaft from said driving shaft when the vehicle is braked.

7. The two-wheel and four-wheel driving change-over device for a vehicle according to claim 1, wherein said change-over mechanism disengages said driven shaft from said driving shaft when the vehicle is braked.

8. The two-wheel and four-wheel driving change-over device for a vehicle according to claim 1, wherein said casing encloses a second bearing for supporting the driving shaft.

9. A two-wheel and four-wheel driving change-over device for a vehicle, comprising:

a change-over unit operatively connected to at least one of a power transmission mechanism adapted to be connected to front wheels and a power transmission mechanism adapted to be connected to rear wheels and for providing intermittent power transmission from the power transmission mechanism;

a driving shaft;

a driven shaft fitted to the driving shaft with an clearance disposed therebetween;

a plurality of engaging or disengaging members installed in the clearance between the driving shaft and driven shaft engage with or disengage from opposing surfaces to perform a connecting operation and a disconnecting operation between the driving shaft and driven shaft;

a change-over mechanism for selectively positioning the engaging or disengaging members between a position where said driving shaft and driven shaft are connected and a position where said driving shaft and driven shaft are disconnected; and a casing enclosing an inner ring and a first end of an outer ring of the change-over mechanism, a second end of the outer ring extending outside of the casing and being fixed to the driving shaft outside of the casing.

10. The two-wheel and four-wheel driving change-over device for a vehicle according to claim 9, wherein said change-over unit is installed in said power transmission mechanism and includes a final gear reducing unit, said driven shaft is inserted into the final gear reducing unit as an input shaft of said final gear reducing unit, and said casing is fixed to said final gear reducing unit.

11. The two-wheel and four-wheel driving change-over device for a vehicle according to claim 10, wherein said second end of the outer ring is connected to said driving shaft through a spline and is rotatably installed in said casing, said inner ring is connected to said driven shaft through a spline and is internally inserted in the first end of the outer ring in a coaxial manner, and said plurality of engaging or disengaging members is installed between the first end of the outer ring and inner ring.

12. The two-wheel and four-wheel driving change-over device for a vehicle according to claim 10, wherein said change-over mechanism disengages said driven shaft from said driving shaft when the vehicle is braked.

13. The two-wheel and four-wheel driving change-over device for a vehicle according to claim 9, wherein said second end of the outer ring is connected to said driving shaft through a spline and is rotatably installed in said casing, said inner ring is connected to said driven shaft through a spline and is internally inserted in the first end of the outer ring in a coaxial manner, and said plurality of engaging or disengaging members is installed between the first end of the outer ring and inner ring.

14. The two-wheel and four-wheel driving change-over device for a vehicle according to claim 13, wherein said change-over mechanism disengages said driven shaft from said driving shaft when the vehicle is braked.

15. The two-wheel and four-wheel driving change-over device for a vehicle according to claim 9, wherein said change-over mechanism disengages said driven shaft from said driving shaft when the vehicle is braked.

16. The two-wheel and four-wheel driving change-over device for a vehicle according to claim 9, wherein the casing encloses a bearing for supporting the driving shaft and another bearing for supporting the driven shaft.

* * * * *